(12) United States Patent
Eismark et al.

(10) Patent No.: US 7,918,206 B2
(45) Date of Patent: Apr. 5, 2011

(54) DEVICE FOR REDUCING SOOT EMISSIONS IN A VEHICLE COMBUSTION ENGINE

(75) Inventors: Jan Eismark, Göteborg (SE); Michael Balthasar, Göteborg (SE)

(73) Assignee: Volvo Lastvagnar AB, Gothenburg (SE)

( * ) Notice: Subject to any disclaimer, the term of this patent is extended or adjusted under 35 U.S.C. 154(b) by 174 days.

(21) Appl. No.: 12/521,034

(22) PCT Filed: Dec. 28, 2006

(86) PCT No.: PCT/SE2006/001509
§ 371 (c)(1), (2), (4) Date: Jun. 24, 2009

(87) PCT Pub. No.: WO2008/082330
PCT Pub. Date: Jul. 10, 2008

(65) Prior Publication Data
US 2010/0095928 A1    Apr. 22, 2010

(51) Int. Cl.
*F02B 3/00* (2006.01)
(52) U.S. Cl. .................. 123/298; 123/301; 123/305
(58) Field of Classification Search .................. 123/298, 123/301, 305
See application file for complete search history.

(56) References Cited

U.S. PATENT DOCUMENTS

| | | | | |
|---|---|---|---|---|
| 5,868,112 A * | 2/1999 | Mahakul et al. | ............... | 123/263 |
| 6,314,933 B1 | 11/2001 | Iijima et al. | | |
| 6,732,703 B2 * | 5/2004 | Eckerle et al. | ................ | 123/298 |
| 6,966,294 B2 * | 11/2005 | Eckerle et al. | ................ | 123/298 |
| 7,431,012 B1 * | 10/2008 | Glenn et al. | .................. | 123/299 |
| 7,650,872 B2 * | 1/2010 | Nishimoto et al. | ........... | 123/279 |
| 2006/0070603 A1 | 4/2006 | Stanton et al. | | |

FOREIGN PATENT DOCUMENTS
WO         0123718 A1      4/2001

OTHER PUBLICATIONS

International Search Report for corresponding International Application PCT/SE2006/001509.

* cited by examiner

*Primary Examiner* — Erick Solis
(74) *Attorney, Agent, or Firm* — WRB-IP LLP (57) ABSTRACT

An internal combustion engine includes a combustion chamber, at least one intake port for directing intake air into the combustion chamber with no/low swirling; a piston with piston bowl, an injector with plurality of orifices arranged to inject fuel with high injection pressure to form spray plumes, each of the plurality of orifices having a central axis oriented at a positive spray angle sufficient to cause the spray/flame to impinge on a piston outer bowl section and a curvilinear shape of the outer bowl section is such that a reflection angle of the impingement of the central axis is positive during at least start of injection in order to increase balance between vertical upwardly directed and tangential movements of the spray/flame and to preserve mixing energy late in the combustion cycle for increased soot oxidation.

18 Claims, 4 Drawing Sheets

DEVICE FOR REDUCING SOOT EMISSIONS IN A VEHICLE COMBUSTION ENGINE

BACKGROUND AND SUMMARY

The present invention relates to a device for controlling the combustion process in a combustion engine. The invention especially relates to such a device for reducing soot emissions in combustion engines in which the fuel/cylinder gas mixture is ignited by compression heat generated in the cylinder.

Soot particles (or particulates) are a product which, during combustion, can both be formed and subsequently oxidized into carbon dioxide (CO2). The quantity of soot particles measured in the exhaust gases is the net difference between formed soot and oxidized soot. The process is very complicated. Combustion with fuel-heavy, i.e. rich, fuel/air mixture with poor mixing at high temperature produces high soot formation. If the formed soot particles can be brought together with oxidizing substances such as oxygen atoms (0), oxygen molecules (O2), hydroxide (OH) at sufficiently high temperature for a good oxidation rate, then a greater part of the soot particles can be oxidized. In a diesel engine, the oxidation process is considered to be in the same order of magnitude as the formation, which means that net soot production is the difference between formed quantity of soot and oxidized quantity of soot. The net emission of soot can therefore be influenced firstly by reducing the formation of soot and secondly by increasing the oxidation of soot. Carbon monoxide emissions (CO) and hydrocarbon emissions (HC) are normally very low from a diesel engine. Yet the percentages can rise if unburnt fuel ends up in relatively cool regions. Such regions are, in particular, zones with intense cooling located close to the cylinder wall. Another example is cavities between piston and cylinder lining.

Nitrogen oxides (NOx) are formed from the nitrogen content in the air in a thermal process which has a strong temperature dependency and depends on the size of the heated-up volume and the duration of the process.

A combustion process in which the fuel is injected directly into the cylinder and is ignited by increased temperature and pressure in the cylinder is generally referred to as the diesel process. When the fuel is ignited in the cylinder, combustion gases present in the cylinder undergo turbulent mixing with the burning fuel, so that a mixture-controlled diffusion flame is formed. The combustion of the fuel/gas mixture in the cylinder gives rise to heat generation, which causes the gas in the cylinder to expand and which hence causes the piston to move in the cylinder. Depending on a number of parameters, such as the injection pressure of the fuel, the quantity of exhaust gases recirculated to the cylinder, the time of injection of the fuel and the turbulence prevailing in the cylinder, different efficiency and engine emission values are obtained.

Below follows two examples of state of the art arrangements attempting to lower both soot and NOx-emissions by controlling the flame, and trying to brake the well known "trade off" between soot emissions and nitrogen oxide emissions, which is typical of the diesel engine, and which "trade-off" is difficult to influence. The majority of measures which reduce soot emissions increase the nitrogen oxide emissions.

EP1216347 shows an arrangement for controlling the combustion process in a combustion engine by controlling the combustion flame, with the purpose to decrease soot and NOx emissions. The fuel is injected into the combustion chamber with a sufficiently high kinetic energy (high injection pressure) so as to supply kinetic energy to the spray in such way that a spray-internal mixing process and a large-scale global mixing process between fuel and cylinder gas is achieved, thus keeping the soot emissions below a selected level. A proportion of recirculated exhaust gas is selected such that the nitrogen oxide emissions are kept below a selected level.

U.S. Pat. No. 6,732,703 shows an arrangement for minimizing NOx emissions and soot particulates. Here, the fuel spray hits inner bowl floor section during injection in order to cool down the combustion thereby decreasing the creation of NOx. The fuel is injected with high pressure and the piston is shaped to maintain the momentum in the spray plume and fuel/air mixture so that good mixing of available oxygen and soot occurs late in the combustion process. A lot of the momentum is lost when the spray plume hits the inner bowl floor section.

Due to coming future emission legislation for combustion engines there is a need to further lower the soot emission levels in order to meet coming demands.

It is desirable to overcome the deficiencies of the prior art and to provide an internal combustion engine containing a combustion chamber arrangement designed to reduce undesirable soot emissions sufficiently to meet new regulated limits. Thus, it is desirable is to minimize the amount of soot by—promoting efficient combustion of the fuel within combustion chamber by ensuring the complete burning/oxidation of the soot formed during the combustion process.

It is also desirable to provide an engine wherein the shape, position and dimensions of various features of the combustion chamber arrangement, including the piston bowl and the injection spray angle, cause the spray/flame to impinge upon and contact the piston bowl surface in the outer bowl section and that the curvilinear shape of said outer bowl section is such that a reflection angle of said impingement of said central axis is positive during at least start of injection in order to increase balance between tangential and vertical upwardly directed movements of the spray/flame.

It is also desirable to provide a diesel engine capable of operate with significant soot emission improvements compared to e.g. an US02-engine, while also satisfying mechanical design constraints for a commercially acceptable engine.

It is also desirable to provide an engine including a combustion chamber arrangement having dimensions and dimensional relationships to ensure oxidation of sufficient amount of soot during combustion to minimize soot available for discharge to the exhaust system. This can be done without increasing the creation of NOx.

According to an aspect of the invention, an engine with a combustion chamber arrangement having certain predetermined combinations of combustion chamber design parameters, including specific combustion chamber dimensions and dimensional relationships is provided. For example, in the preferred embodiment an engine with a combustion chamber, comprises: an engine body including an engine cylinder, a cylinder head forming an inner face of the combustion chamber and at least one intake port formed in the cylinder head for directing intake air into the combustion chamber with no or low swirling effect during operation; a piston positioned for reciprocal movement in said engine cylinder between a bottom dead center position and a top dead center position, said piston including a piston crown comprising a top face facing the combustion chamber, said piston crown comprising a piston bowl formed by an outwardly opening cavity, said piston bowl comprising a projecting portion having a distal end and an inner bowl floor section extending inwardly at an positive inner bowl floor angle (a) from a plane perpendicular to an axis of reciprocation of the piston, said piston bowl further comprising an outwardly flared outer bowl section having a concave curvilinear shape in cross section; an injector mounted on the engine body adjacent said projecting portion of said piston bowl to inject fuel into the combustion chamber with high injection pressure, said injector comprising a plurality of orifices arranged to form fuel spray plumes, which eventually becomes flames. One preferred embodiment of the invention is characterized in that each of said plurality of orifices has a central axis oriented at a positive spray angle from a plane perpendicular to the axis of reciprocation of the piston sufficient to cause the spray/flame to impinge on said outer bowl section and that the curvilinear shape of said outer bowl section is such that a reflection angle of said impingement of said central axis of said orifices is positive during at least start of injection in order to increase balance between tangential and vertical upwardly directed movements of the spray/flame and to preserve mixing energy late in cycle for increased soot oxidation.

In a further developed embodiment of the invention said injector is arranged to inject fuel with an average injection pressure in the range of 1000 to 3000 bar. In a further preferred embodiment said average injection pressure is in range of 1500 to 2500 bar.

In one further preferred embodiment of the invention said central axis is arranged to impinge said outer bowl section during the whole injection.

In another further preferred embodiment of the invention the curvilinear shape of said outer bowl section has a radius in the dimensionless range of 0.054 to 0.117, and by which figures of the dimensionless range a range in a length measure can be provided for an engine with a specific engine cylinder volume by multiplying said dimensionless figures for said radius with a cylinder volume of said specific engine and elevated by one third. In a more preferable embodiment of the invention said radius is in the range of 0.066 to 0.101. The dimensionless scaling method is further described below.

In another further preferred embodiment of the invention said reflection angle of said impingement is in the range of >0 to 50 degrees when said piston is at a top dead center position. In another preferred embodiment of the invention the reflection angle ($\gamma$) is in the range of 10<$\gamma$<35 degrees at a top dead center position.

In still another preferred embodiment of the invention said reflection angle of said impingement is in the range of >0 to 50 degrees during start of injection and larger part of said injection and that said reflection angle is slightly negative during end of injection. In another preferred embodiment of the invention the reflection angle ($\gamma$) is in the range of 10<$\gamma$<35 degrees during start of injection.

In still another preferred embodiment of the invention said reflection angle of said impingement is in the range of >0 to 50 degrees during the whole injection. In another preferred embodiment of the invention the reflection angle ($\gamma$) is in the range of 10<$\gamma$<35 degrees during the whole injection.

In another preferred embodiment of the invention the number of said orifices are 4 or more, and in a further embodiment 5 to 7.

In another one further preferred embodiment of the invention said swirling effect resulting in a swirl ratio in the range of 0.0 to 0.7.

In another one further preferred embodiment of the invention a geometry of the inner bowl floor section in relation to the spray axis is arranged in such a way so that there is enough volume and distance between the inner bowl floor section and the spray axis (30) so that disturbing contact between the unignited nozzle near portion of the spray and the inner bowl section is avoided.

In another one further preferred embodiment of the invention said injected fuel, when injected, is arranged to form a mixture with said intake air in said combustion chamber, and that said mixture self ignites when compressed by said piston.

In another one further preferred embodiment of the invention said engine is arranged to add a predetermined portion of re-circulated exhaust gas to said intake air, said portion being adapted so that nitrogen oxide emissions emerging from said combustion are kept below a selected low level.

Further advantageous embodiments of the invention emerge from the following detailed description.

BRIEF DESCRIPTION OF THE DRAWING

The present invention will be described in greater detail below with reference to the accompanying drawings which, for the purpose of exemplification, shows further preferred embodiments of the invention and also the technical background, and in which.

DETAILED DESCRIPTION

Figure 1:
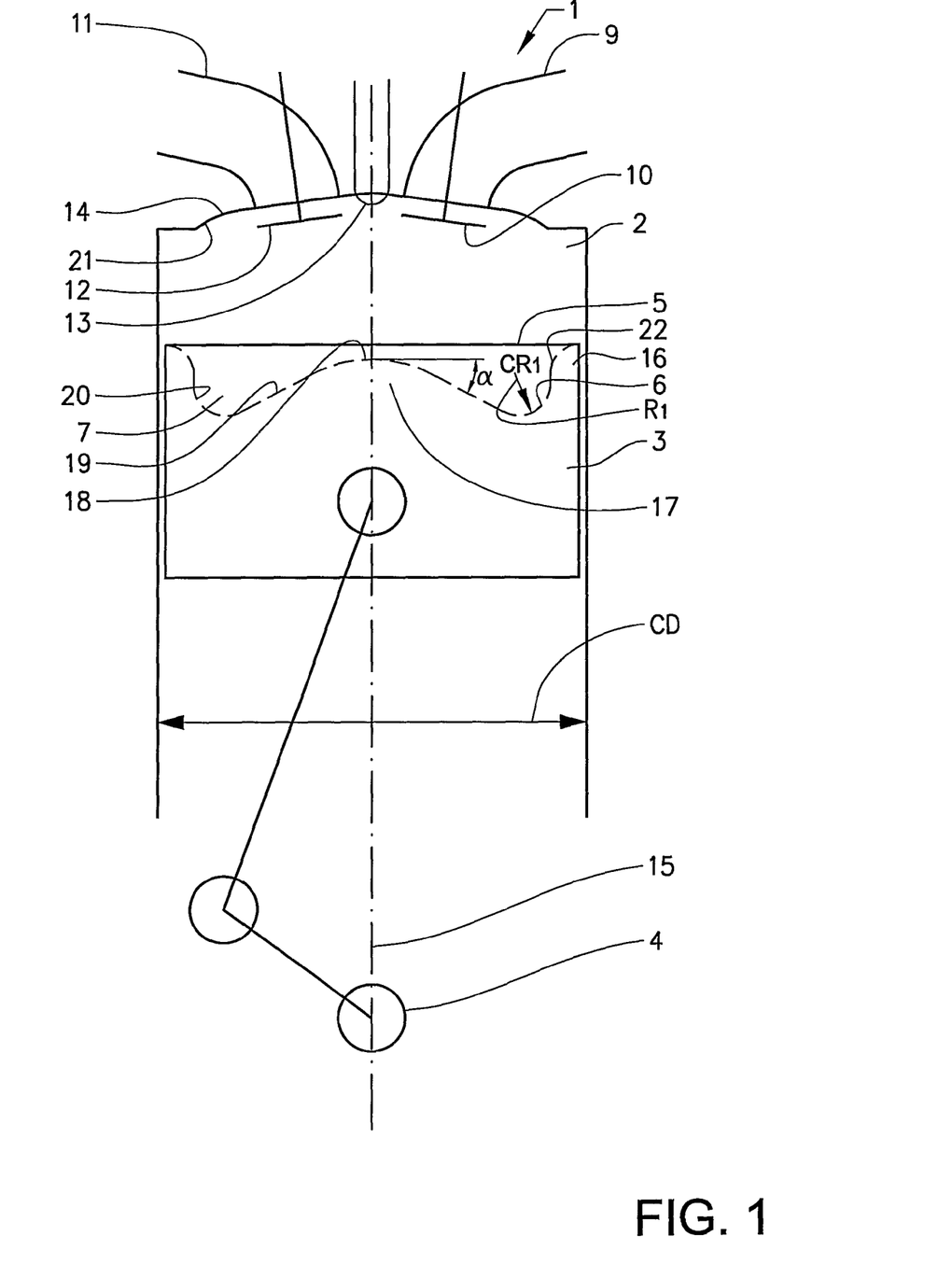
FIG. 1 diagrammatically shows a cut view of a piston and cylinder in a combustion engine of an embodiment of the invention.
Figure 2A:
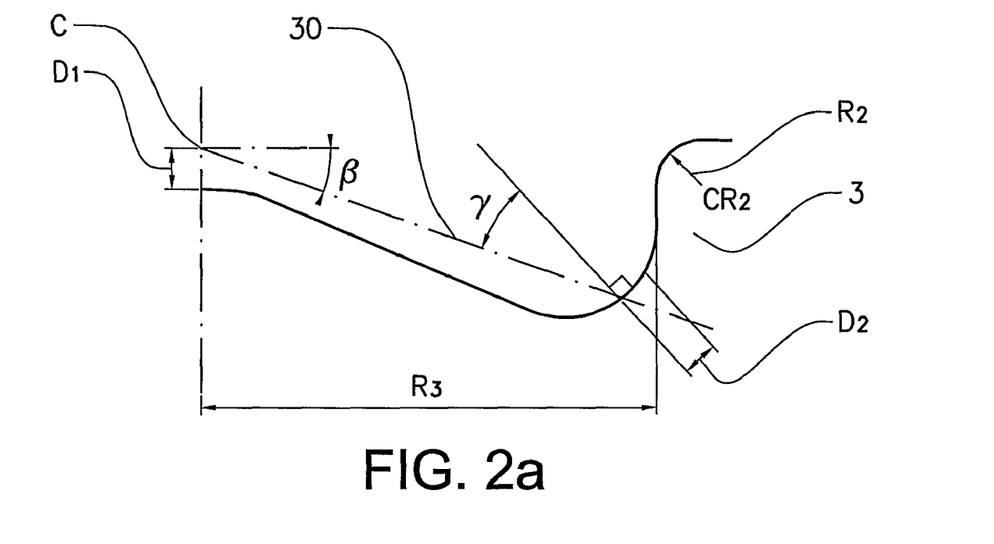
FIG. 2a diagrammatically shows the right half of the piston in FIG. 1 with reflection angle of the geometrical central axis of the spray according to the invention.

To understand the unique physical characteristics of combustion chamber 7 according to the invention, attention is initially directed to FIGS. 1 and 2a illustrating the various physical characteristics or parameters which are required to achieve the unexpected emission reduction advantages of the present invention.

In FIG. 1, a diagrammatic view is shown of a combustion engine 1 which is designed to work according to the diesel process. The engine 1 comprises a cylinder 2 and a piston 3, which reciprocates in the cylinder 2 and is connected to a crankshaft 4 so that the piston 3 is set to reverse in the cylinder 2 at an upper and lower dead centre position. As is also common, one end of the cylinder cavity is closed by a engine cylinder head 14. The piston 3 is provided in its upper surface 5 with a piston bowl 6, which forms a combustion chamber 7, together with inner surface 21 of a cylinder head 14 and walls of the cylinder 2. In the cylinder head 14 one or more induction ports 9 are arranged. The connection between a respective induction port 9 and the cylinder 2 can be opened and closed with an induction valve 10 disposed in each induction port 9. Arranged in the cylinder head are also one or more exhaust ports 11. The connection between a respective exhaust port 11 and the cylinder 2 can be opened and closed with an exhaust valve 12 disposed in each exhaust port 11. The opening and closing of valves 10 and 11 may be achieved by a mechanical cam or hydraulic actuation system or other motive system in carefully controlled time sequence with the reciprocal movement of piston 3.

In the cylinder head 14 there is disposed at least one fuel injector 13, through which fuel is injected into the cylinder 2 as a fuel spray so that the fuel is mixed with gas compressed in the cylinder 2 to form a fuel/gas mixture, which is ignited by compression heat generated in the cylinder 2. The ignited part of the spray forms a flame. During injection a part of the spray closest to the injector with newly injected fuel has not yet started to burn. The fuel is preferably injected with a very high pressure. Injector 13 includes a plurality of small injection orifices (not shown), formed in the lower end of a nozzle assembly of the injector 13 for permitting the high pressure fuel to flow from a nozzle cavity of the injector 13 into the combustion chamber 7 with a very high pressure to induce thorough mixing of the fuel with the high temperature, compressed charge air within combustion chamber 7. It should be understood that injector 13 may be any type of injector capable of injecting high pressure fuel through a plurality of injector orifices into the combustion chamber 7 in the manner described hereinbelow. Moreover, injector 13 may include a mechanically actuated plunger housed within the injector body for creating the high pressure during an advancement stroke of the plunger assembly. Alternatively, the injector 13 may receive high pressure fuel from an upstream high pressure source such as in a pump-line-nozzle system including one or more high pressure pumps and/or a high pressure accumulator and/or a fuel distributor. The injector 13 may include an electronically actuated injection control valve which supplies high pressure fuel to the nozzle valve assembly to open a nozzle valve element, or controls the draining of high pressure fuel from the nozzle valve cavity to create a pressure imbalance on the nozzle valve element thereby causing the nozzle valve element to open and close to form an injection event. For example, the nozzle valve element may be a conventional spring-biased closed nozzle valve element actuated by fuel pressure. The fuel injector 13 is preferably centrally disposed in the cylinder head so a geometrical central axis of the fuel injector coincide with a geometrical central axis 15 of the cylinder, which geometrical central axis also is an axis of reciprocation of the piston 3, as shown in FIG. 1.

The combustion engine 1 shown in FIG. 1 works according to the four-stroke principle. The engine 1 preferably comprises a plurality of cylinders 2, each provided with a piston 3, where each piston 3 is connected to a common crankshaft 4 through a connecting rod and thus causing the piston to reciprocate along a rectilinear path within the cylinder 2 as the engine crankshaft 4 rotates.

FIG. 1 illustrates the position of the piston 3 circa 45 degrees before a top dead center (TDC) position. A TDC position is achieved when the crankshaft is positioned to move the piston to the furthest most position away from the rotational axis of the crankshaft. In the conventional manner, the piston moves from the top dead center position to a bottom dead center (BDC) position when advancing through intake and power strokes. For purposes of this disclosure, the words "upward" and "upwardly" correspond to the direction away from the engine crankshaft and the words "down" and "downwardly" correspond to the direction toward the crankshaft of the engine or bottom dead center position of the piston.

At an uppermost, TDC position, piston 3 has just completed its upward compression stroke during which the charge air allowed to enter the combustion chamber 7 from induction port 9 is compressed thereby raising its temperature above the ignition temperature of the engine's fuel. This position is here considered as the 360 degrees position commencing the expansion/combustion stroke of the complete 720 degrees four stroke cycle of piston 3. The amount of charge air that is caused to enter the combustion chambers may be increased by providing a pressure boost in the engine's intake manifold. This pressure boost may be provided, for example, by a turbocharger (not shown) driven by a turbine powered by the engine's exhaust, or maybe driven by the engine's crankshaft.

The engine of the present invention includes combustion chamber components and features sized, shaped and/or positioned relative to one another, as described hereinbelow, to advantageously reduce particulate matter (PM) to levels at or below new regulatory standards while maintaining acceptable fuel economy. The invention is especially directed to reduce soot emissions. Soot is one fraction of PM.

Specifically, the dimensions, shape and/or relative positioning of the combustion chamber components and features are such that the momentum of the fuel spray/burning cylinder gas flame is preserved as long as possible on its way from the injector in a slightly downward direction following the shape of the inner floor bowl section 19 and outer bowl section 20, and further upwards until impingement with inner surface 21 of the cylinder head occurs, thus ensuring sufficient oxidation of soot later in the combustion event. Further, the dimensions, shape and/or relative positioning of the combustion chamber components and features are such that a predetermined level of balance between vertical (mainly upward) and tangential momentum (directed in a plane perpendicular to the axis 15) of the fuel spray/flame is achieved. According to the invention this balance is important to reach in order to be able to achieve very low soot emission levels. Parameters controlling the balance are selected such that the spray/flame after it has impinged the outer bowl section 20 mainly directed in an upward direction towards the inner surface 21 of the cylinder head, in order to minimize loss of momentum.

Figure 3:
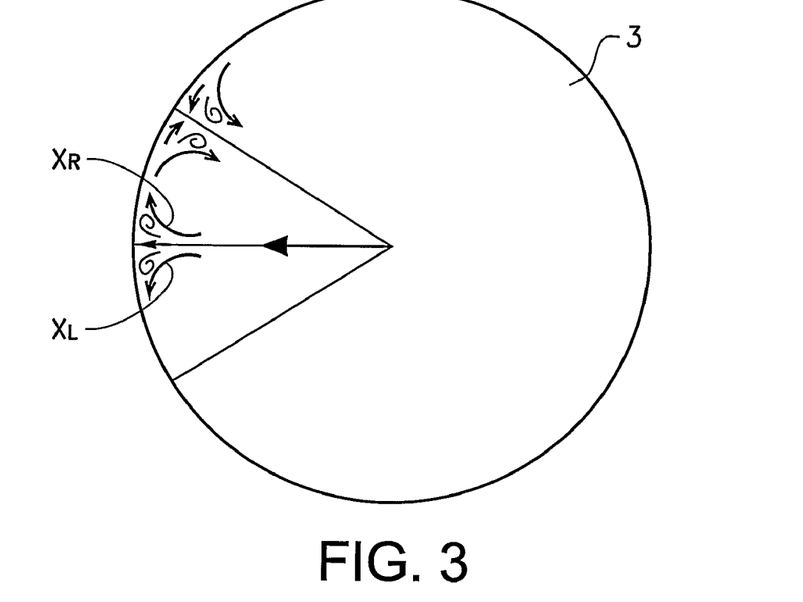
FIG. 3 diagrammatically shows a top view of the piston in FIG. 1 with spray/flame flows according to an embodiment of the invention.
Figure 4:
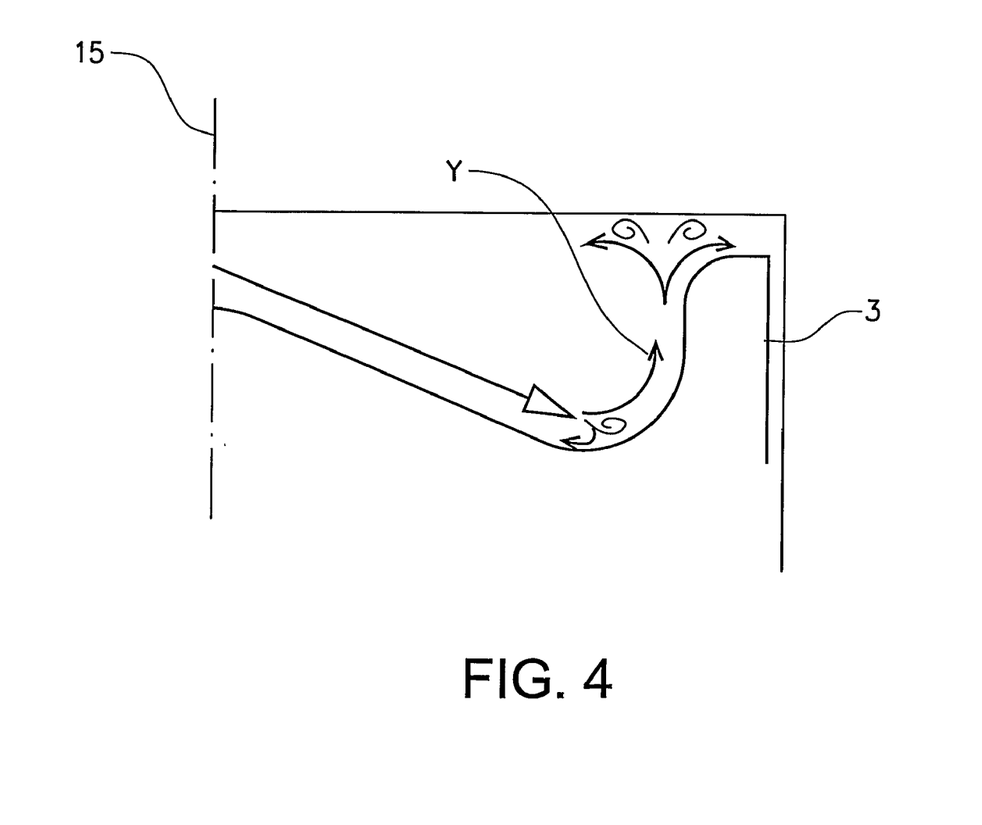
FIG. 4 diagrammatically shows corresponding side view of the spray/flame flows in FIG. 3.

Preferably, the vertical and tangential movements of the flame form a fan-shaped pattern (see also FIG. 5d, explained below) just after impingement with outer bowl section 20, where approximately ⅓ of the flame movements are directed upwardly, as indicated with Y in FIG. 4, and the rest are directed in a tangential direction, as indicated with XR for the parts of the flame turning right and with XL for the parts of the flame turning left in FIG. 3. The dimensions, shape and/or relative positioning of the combustion chamber components and features as described hereinbelow results in a combustion chamber capable of forming, directing, controlling and creating a pattern of injected fuel and most of all burning fuel/cylinder gas mix (flame) within the combustion chamber 7 during both the initial stages of fuel injection and during the initiation of combustion and expansion of the resulting gases during the power stroke of the piston 3 and after end of injection so as to achieve very high reduction of soot emissions.

More particularly, the upper portion of piston 3 may be referred to as the piston crown 16. Piston crown 16 includes the upper surface 5 partially forming combustion chamber 7 and a piston bowl 6 formed by an upwardly opening cavity. Piston bowl 6 includes a projecting portion 17 preferably positioned at or near the center of bowl 6. Projecting portion 17 includes a distal end 18 positioned, in the preferred embodiment shown in FIG. 1, at the center of piston bowl 3 and thus positioned along the axis of reciprocation 15 of piston 3. Projecting portion 17 also includes an inner bowl floor section 19 extending from projecting portion 17 downwardly at an inner bowl floor angle α from a plane perpendicular to the axis of reciprocation of piston 3 as shown in FIG. 1.

Piston bowl 6 also includes an upwardly flared outer bowl section 20 having a generally concave curvilinear shape in diametric cross section. Outer bowl section 20 effectively shapes and directs the flow of the fuel/air mixture or flame within the combustion chamber.

FIG. 2a diagrammatically shows the right half of the bowl shape of the piston in FIG. 1 with reflection angle γ of the geometrical central axis 30 of the spray (below designated spray axis) and spray axis angle β (below designated spray angle). Outer bowl section 20 is designed with a particular radius R1 and a particular location for a center of radius CR1. D1 further indicates the distance between the distal end 18 and the crossing point C of the several spray axis in the injector 13. Distance D2 indicates the duration of the injection and change/movement of spray axis impingement point during the downward movement of the piston 3. The position of start and end of D2 is dependent on time duration (amount of fuel to be injected) and timing of the injection. R2 indicates a radius at the lip or edge connecting outer bowl 20 with the upper surface 5 of the piston 3. Center of radius R2 is indicated CR2. R3 indicates piston bowl radius. While the general shape of the combustion chamber has antecedence in the prior art, it is the specific configuration, and more importantly, the critical dimensions and dimensional relationships described hereinbelow which result in the improved functional performance of the present invention.

According to the invention the spray angle β should be selected such that the spray axis 30 impinges the outer bowl section 20 at least during the start of an injection. At the same time the parameters R1 and piston bowl radius R3 deciding the shape of the outer bowl section should be selected such that the reflection angle Y is positive at least during start of injection and preferably during most of the following injection duration. R3 is in a dimensionless range (see explanation below) of 0.33 to 0.39, preferably 0.35 to 0.37. Preferably the reflection angle γ can be chosen in the range of 0<γ<50 degrees during start of injection. The applicant has found that a reflection angle within the range of 0<γ<50 degrees during the whole injection gives the lowest soot emission levels. According to one embodiment of the invention the reflection angle can be positive during most of the injection and negative only during and close to end of injection. In a further preferred embodiment of the invention the reflection angle is in the range of 10<γ<35 degrees.

Figure 2B:
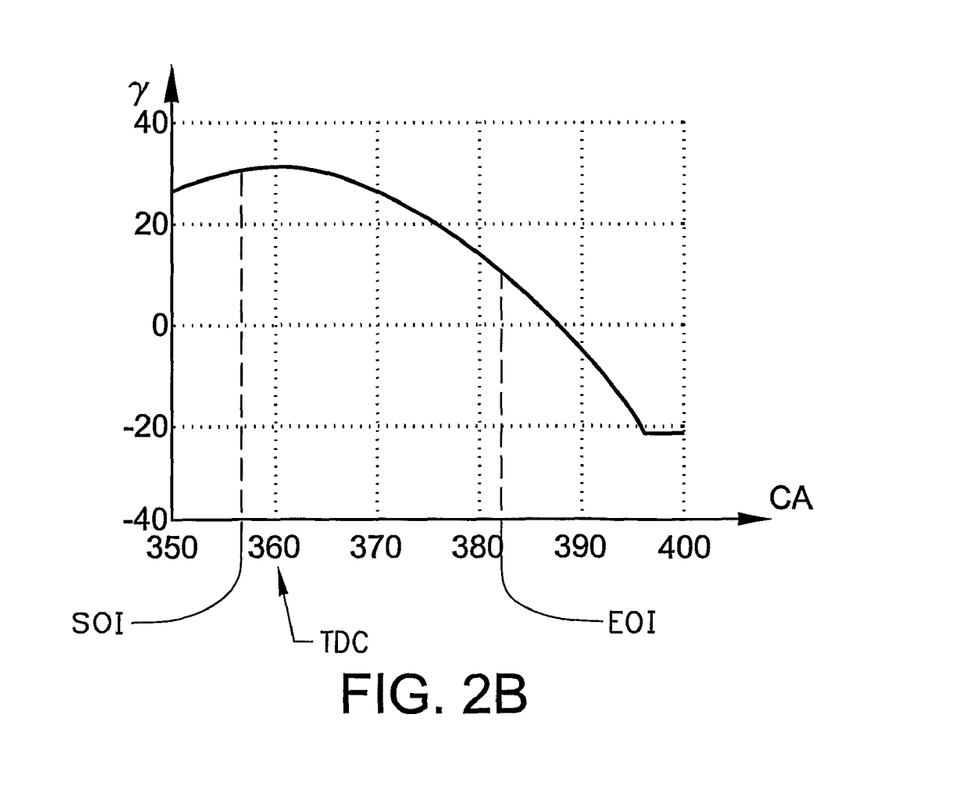
FIG. 2b shows a diagram over the relation between piston position and reflection angle of the geometrical central axis of the spray of an embodiment of the invention.

In FIG. 2b an example of how the reflection angle γ varies during an injection period is shown. The x-axis shows crank angle CA of the engine. SOI indicates start of injection and EOI indicates end of injection. In the shown example SOI occurs at circa 356 degrees, i. e. 4 degrees before TDC, and EOI occurs at approximately 382 degrees. In the shown example the reflection angle is approximately 29 degrees at SOI and increasing to a maximum of 31 degrees at TDC before the curve turns downwards ending up with a reflection angle of 10 degrees at EOI. According to the invention a positive reflection angle during an injection minimizes the loss of momentum of the spray/flame flow when it flows along the outer bowl section 20. A reflection angle closer to the upper range limit gives in general a lower loss in momentum of the spray/flame when the spray/flame is forced to change direction due to impingement with the outer bowl section 20. The value of the reflection angle during an injection is strongly dependent of the selection of several geometrical parameters, such as Di, Ri, β and piston bowl radius R3, besides the injection timing and injection duration.

As indicated before the fuel should be injected with a high injection pressure. A preferable average injection pressure interval is 1000 to 3000 bar, and in a further preferable range 1500 to 2500 bar. The injection pressure is an important parameter to ensure high momentum in the spray/flame flow throughout the movement along the inner bowl floor section, outer bowl flow section, impingement with the inner surface of the cylinder head and in particular the movements of the cylinder gas following the EOI.

Another combustion chamber parameter for controlling emissions is the swirl ratio of the air flow that is generated by the induction ports 9. The swirl ratio SR is a ratio of the tangential velocity of the air spinning around combustion chamber 7 divided by the engine speed. That is, the swirl ratio is a measure of the tangential motion of the air as it enters the engine cylinder from the induction ports 9 of the cylinder head 14. Precisely, the term swirl ratio refers to the average in-cylinder angular velocity of the air at intake valve closing divided by the cylinder piston angular velocity. For example, an engine running at 1800 rpm with a cylinder head generating an air motion with a swirl ratio of 2 implies that the air in the cylinder at intake valve closing is rotating with an average angular velocity of 3600 rpm. The higher the swirl ratio, the greater the swirling effect of the air or air fuel mixture, while the lower the swirl ratio, the lower the swirling effect. The swirling effect is a generally tangential motion that upon compression by piston 3 creates turbulence and assists in the combustion process. According to, the invention, to be able to ensure control of the spray/flame movement during the whole combustion, the momentum created by the injection pressure should be disturbed as little as possible. Thus, according to the invention low swirl is preferable to be able to achieve maximum advantage of the present invention. In this description a swirl below 1.0 is considered to be low swirl. The applicant has found that a swirl ratio below 0.7 is preferable, and even more preferable is a swirl ratio below 0.5 and down to zero.

The outer bowl section 20 is designed with a particular radius R1 and a particular location for a center of radius CR1 so as to ensure the spray plume interacts with an inner surface 21 of the cylinder head 14 in an appropriate manner to ensure proper mixing and burning of especially soot late in the combustion process. Specifically, the radius R1 can be selected in the dimensionless range of 0.054 to 0.117, and preferably within a dimensionless range of 0.066 to 0.101. Starting from the relation between length and volume scales according to the formula:

$$\frac{r_1}{r_2} = \left(\frac{V_1}{V_2}\right)^{1/3} \quad (1)$$

a dimensionless factor ε can be provided by rearranging the mentioned formula to:

$$\varepsilon = \frac{r_1}{V_1^{1/3}} = \frac{r_2}{V_2^{1/3}} = \frac{r_3}{V_3^{1/3}} = \text{etc.} \quad (2)$$

The figures of the dimensionless ranges can be translated to a length measure, e.g. millimeters, by choosing an engine with a specific engine cylinder volume in cubic millimeters, thus multiplying said dimensionless figures for said radius with the cylinder volume of said specific engine and elevated by one third, i. e. radius=(dimensionless figure)*(cylinder volume) ⅓. For example the upper limit of the first mentioned range, i. e. 0.08, gives with a cylinder volume of 2.0 liters/cylinder the following upper limit radius:

$$R = \varepsilon \cdot V^{1/3} = 0.08*(2.0*10^6)^{1/3} = 10.1 \text{ mm}$$

In the corresponding way other parameters mentioned in this description can be translated from the mentioned dimensionless ranges for the different parameters for different engine sizes.

By combining the magnitude of R1 and the location of CR1 the present invention creates outer bowl section 20 with an upward flare capable of controlling the momentum of the spray plume/flame as it follows outer bowl section 20 and changes direction upwardly towards the inner surface 21 of the cylinder head. In an alternative embodiment the shape of the outer bowl section 20 does not need to follow a radius of a circle. Instead the shape of the outer bowl section could change radius along its profile.

Specifically, the position of CR1 and the magnitude of R1 ensures that the flame rolling off the upper edge with radius R2 of piston bowl 6 has sufficient momentum to be directed into cylinder head 20 resulting in the proper degree of mixing and oxidation of soot. Outer bowl section 20 is specifically designed to prevent inadequate momentum of the spray/flame which would cause undesirable stagnation of the spray/flame without interaction with the cylinder head thereby resulting in inadequate mixing and burning of soot. This is achieved by having an R1 that is sufficiently large resulting in a curvature in outer bowl section 20 to create and maintain the momentum in the spray/flame. Outer bowl section 20 is also designed to prevent excessive momentum in the spray/flame in one or several directions which would cause the spray/flame to progress to much in a certain direction, compared to others directions, causing undesirable stagnation of the spray/flame and thus leaving behind increased soot emissions.

According to the invention there should be a balance between the directions of movement of the spray/flame. Thus, R1 is designed to modulate the momentum of the spray/flame to ensure the spray/flame has sufficient momentum to interact with the cylinder head and reflect back or re-circulate into the open space of the combustion chamber 7 in a predetermined pattern (see further FIG. 5f and below). A proportionately small R1 tends to decrease the momentum of the combustion plume.

The upper vertical surface 22 of outer bowl section 20 adjacent edge with radius R2 preferably extends vertically parallel to the geometrical central axis of the piston 3, or slightly inward toward or slightly outward in relation to the axis of reciprocation of piston 15 to influence flame to cylinder head flow situation and set up of further flame recirculation process. The curvilinear shape of outer bowl section 20 may be formed by a surface having a radius of curvature R1 which terminates before edge with radius R2 while an upper vertical surface 22 of outer bowl section 20 extends tangentially from the surface having a radius of curvature Ri, vertically to edge with radius R2. Preferably, CR1 is positioned below top face 5, and preferably the upper vertical surface 22 does not intersect edge with radius R2 in a manner which directs gases outwardly toward the walls of cylinder 2. In this manner, proper control of the spray/flame and control of the interaction with the cylinder head is enhanced while preventing interaction with the cylinder walls thereby reducing the risk of carbon build-up on liner of the cylinder 2, due to that the flame control according to the invention directs most of the flame inwardly, towards the axis of reciprocation 15.

As already indirectly mentioned above an important aspect of the subject invention involves orienting the central axis of each orifice in a spray angle β measured between a plane perpendicular to the axis of reciprocation of the piston and a central axis 30 of each spray (FIG. 2a) so that the spray axis 30 impinges the outer bowl section 20 during at least SOI. The geometry of the inner bowl floor section 19 in relation to the spray axis 30 is such that there is enough volume and distance between the inner bowl floor section and the spray axis 30 so that disturbing contact between the not ignited nozzle near portion of the spray and the inner bowl section is avoided. This action causes spray axis 30 to be directed toward outer bowl section 20 with minimal contact with the inner bowl floor section, thus avoiding disturbing the ignition of the spray. In this way contribution is made to maximize the preserving of spray/flame momentum up to the spray/flame impinges the outer bowl section. The vertical distance measured from the distal end 18 of projecting portion 17 to a crossing point C of several spray axis in the injector 13 is in FIG. 2a indicated by D1.

Another important combustion chamber parameter significantly affecting soot emissions is the number of injection or spray orifices in the injector 13. In accordance with the present invention, at least four injection orifices are used to deliver fuel to combustion chamber 7. Preferably, five to seven injection orifices can be used. The number of injection orifices N is critical for creating the proper balance, mentioned above, between the vertical and tangential movements of the spray/flame. If there is to many injection orifices the distance between the different points of spray axis impingements (with the outer bowl section) would become to close to each other so that a smooth turn around movement (re-circulation) of the spray in a horizontal plane would be restraint, and the upward vertical movement could become to strong, which could result in spray/flame regions where substantially all momentum is lost, thus the after oxidation of soot would decrease. Another important parameter that effects the re-circulation is fuelling rate.

Another combustion chamber parameter which can be set to assist in minimizing the risk of momentum loss is a vertical distance (not shown) measured from the center of the outlet openings of injection orifices in the injector 13 to the inner surface 21 of the cylinder head 14. That is, said distance represents the distance the injection orifices protrude into the combustion chamber 7 below cylinder head 14. Applicants have found that the range of this distance should preferably be at least 0.008 (dimensionless), in order to distance the spray/flame from the surface of the cylinder head 14 during the initial stage of injection in the same way as the spray/flame should not come to close the inner bowl floor section 19 (see description above).

Another critical combustion chamber parameter is the radius of curvature R2 at the lip or edge of combustion bowl 6 as shown in FIG. 2a. Although the radius R2 is only shown at FIG. 2a at one point along the edge, it should be understood that R2 is formed along the entire edge around the circumference of piston bowl 6. R2 is preferably in the dimensionless range of 0.02 to 0.08. The upper limit of 0.08 is important for maintaining the control over the flow direction of the flame as it flows off the outer bowl section 20.

Figure 5A:
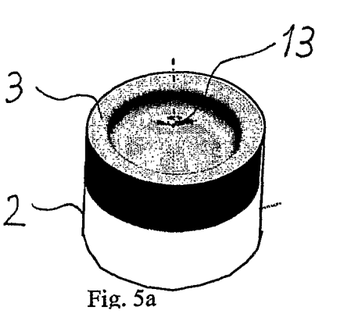
FIGS. 5a to 5i shows three-dimensionally and diagrammatically a piston according to the invention with cylinder in nine different on-the-spot accounts during a fuel injection and combustion sequence.

To increase the understanding of the inventive spray/flame control FIGS. 5a to 5i shows three-dimensionally and diagraitimatically a piston 3 according to the invention with cylinder 2 in nine different on-the-spot accounts during a fuel injection and combustion sequence, i. e. from approximately 5 degrees before TDC to a time spot late in the combustion sequence, i. e. long after TDC. The beginning of a spray axis 30 of two adjacent positioned sprays is indicated with a dotted line in FIGS. 5a to 5i. In order to increase the clarity of the FIGS. 5a to 5i only two of several sprays are shown. FIG. 5a shows start of injection (SOI). There is a ignition delay, which occurs between SOI and ignition of the fuel.

Figure 5B:
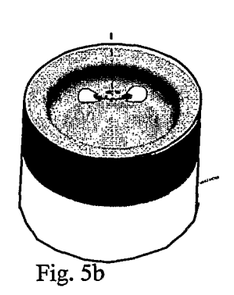
Figure 5C:
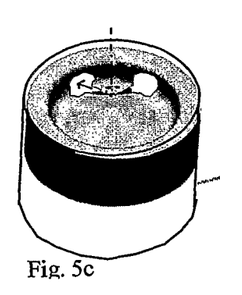

FIG. 5b shows start of combustion (SOC). The white areas indicate burning cylinder gas flames. FIG. 5c shows when the flames impinges the outer bowl section 20 (FlameToWall). The direction of movement of the left flame (corresponding counts for the right flame) is indicated with an arrow. Thus, the flames move from injector 13 towards outer bowl section 20.

Figure 5D:
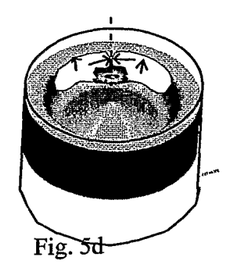

FIG. 5d shows when the flames meet one another (FlameToFlame). The collision is indicated by that two of the four arrows are pointing at each other. According to the invention a balance between vertical and tangential movements is achieved when the flames after first impingement with outer bowl section (FIG. 5c) are spread in a sun fan-shaped pattern as indicated in FIG. 5d. This is achieved by selecting above mentioned parameters within mentioned ranges. The vertical arrows in FIG. 5d correspond to Y in FIG. 4, and the arrow pointing to the right in FIG. 5d corresponds to XR in FIG. 3 and finally the arrow pointing to the left in FIG. 5d corresponds to XL in FIG. 3.

Figure 5E:
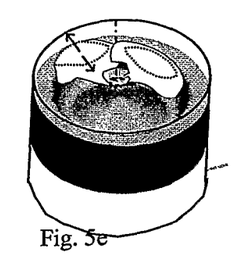
Figure 5F:
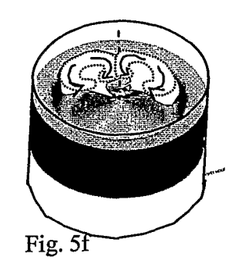

FIG. 5e shows when the flames impinge the inner surface of the cylinder head 21 (FlameToHead). This is indicated by a dotted area in the flames. Within said dotted area the flames are in contact with the inner surface 21 of the cylinder head 14. The two arrows in the left flame indicate the main movements of the flames along said inner surface 21. FIG. 5f shows the, for the invention, important flame re-circulation, which is forced by the FlameToHead and FlameToFlame interaction and which is a result of mainly selecting the above mentioned parameters within the mention ranges so that said balance between vertical and tangential flame movements is achieved. A certain choice of said parameters controls timing and position of said flame recirculation, shown especially i FIG. 5f, but also in FIGS. 5g to 5i. Especially a symmetric FlametoFlame interaction creates useful flame recirculation vortexes. The arrows indicate the direction of movement of the flame re-circulation, which are directed back into the combustion chamber 7. The low swirl is here indirectly a reason for more intensive mixing thanks to symmetry-driven creation of FlameToFlame-induced vortexes. Adjacent flames actually collide and force each other to eventually move towards the axis of reciprocation 15. With enough mixing energy (momentum) left, this flame recirculation contributes to mix and burn the last injected (and soot producing) fuel and thus also to oxidize soot late in the combustion sequence.

Figure 5G:
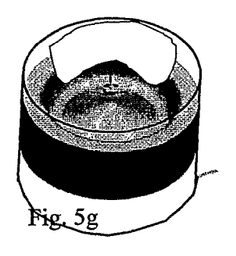
Figure 5H:
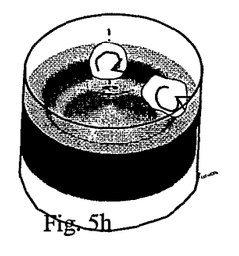
Figure 5I:
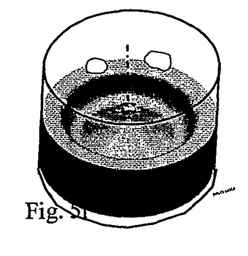

FIG. 5g shows end of injection (EOI), thus momentum from the injection pressure has ended and further movements of the cylinder gas depends mainly on earlier provided momentum from the injection pressure. FIG. 5h shows soot oxidation and spray dilution after EOI, due to powerful mix of the cylinder gases/flame. FIG. 5i shows late after burn rich pocket soot oxidation, which the current invention is aiming at to increase with control of the spray/flame movements with the purpose to preserve momentum in the cylinder gases as long as possible after EOI.

One important advantage of the invention is that low temperature soot after-oxidation can exist without significant nitrogenoxide (NOx) formation. The different embodiments of the invention for reducing particulates/soot emissions can advantageously be combined with different known exhaust aftertreatment arrangements for reducing NOx, (and also soot traps) to lower the NOx-emissions even further. The invention can advantageously also be combined with an exhaust gas recirculation (EGR) device, by which the level of NOx-emissions can be controlled independently of the particulates/soot emissions (see e.g. EP1216347).

Combinations of the above described combustion chamber parameters selected within the specified ranges provide advantages in reducing soot/particulates emissions in comparison to conventional engine designs, including specifically meeting new emissions standards relative to especially soot. The inventive combustion chamber 7 specifically includes a positive reflection angle γ, low swirl and high injection pressure and the positive effects of the invention can be further increased in combination with right selection of one or several of the other above mentioned parameters.

The dimension], ess ranges provided in the present application can be applied on engines of passenger car size and up to an engine size of a big ship.

The invention should not be deemed to be limited to the embodiments described above, but rather a number of further variants and modifications are conceivable within the scope of the following patent claims.

The invention claimed is:

1. An internal combustion engine with a combustion chamber, comprising: an engine body including an engine cylinder, a cylinder head forming an inner surface of the combustion chamber and at least one intake port formed in the cylinder head for directing intake air into the combustion chamber with no or low swirling effect during operation; a piston positioned for reciprocal movement in the engine cylinder between a bottom dead center position and a top dead center position, the piston including a piston crown comprising an upper surface facing the combustion chamber, the piston crown containing a piston bowl formed by an outwardly opening cavity, the piston bowl comprising a projecting portion having a distal end and an inner bowl floor section extending downwardly at an positive inner bowl floor angle from a plane perpendicular to an axis of reciprocation of the piston, the piston bowl further comprising an outwardly flared outer bowl section having a concave curvilinear shape in cross section; an injector mounted on the engine body adjacent the projecting portion of the piston bowl to inject fuel into the combustion chamber with high injection pressure, the injector comprising a plurality of orifices arranged to form fuel spray plumes, which eventually becomes flames, wherein each of the plurality of orifices has a central axis oriented at a positive spray angle from a plane perpendicular to the axis of reciprocation of the piston sufficient to cause the spray/flame to impinge on the outer bowl section and the curvilinear shape of the outer bowl section is such that a reflection angle of the impingement of the central axis is positive during at least start of injection in order to increase balance between tangential and vertical upwardly directed movements of the spray/flame and to preserve mixing energy late in the combustion cycle for increased soot oxidation.

2. An internal combustion engine as in claim 1, wherein the injector is arranged to inject fuel with an average injection pressure in the range of 1000 to 3000 bar.

3. An internal combustion engine as in claim 2, wherein the average injection pressure is in range of 1500 to 2500 bar.

4. An internal combustion engine as in claim 1, wherein the central axis of the orifices is arranged to impinge the outer bowl section during the whole injection.

5. An internal combustion engine as in claim 1, wherein the curvilinear shape of the outer bowl section has a radius in the dimensionless range of 0.054 to 0.117, and by which figures of the dimensionless range a range in a length measure can be provided for an engine with a specific engine cylinder volume by multiplying the dimensionless figures for the radius with a cylinder volume of the specific engine and elevated by one third.

6. An internal combustion engine as in claim 5, wherein the curvilinear shape of the outer bowl section has a radius in the dimensionless range of 0.066 to 0.101.

7. An internal combustion engine as in claim 5, wherein the curvilinear shape of the outer bowl section has a radius that is substantially constant along its profile.

8. An internal combustion engine as in claim 5, wherein the curvilinear shape of the outer bowl section has a radius that varies along its profile.

9. An internal combustion engine as in claim 1, wherein the reflection angle of the impingement is in the range of >0 to 50 degrees when the piston is at a top dead center position.

10. An internal combustion engine as in claim 1, wherein the reflection angle of the impingement is in the range of >0 to 50 degrees during start of injection and larger part of the injection and that the reflection angle is slightly negative during end of injection.

11. An internal combustion engine as in claim 1, wherein the reflection angle of the impingement is in the range of >0 to 50 degrees during the whole injection.

12. An internal combustion engine as in claim 1, wherein the reflection angle of the impingement is in the range of $10<\gamma<35$ degrees.

13. An internal combustion engine as in claim 1, wherein the number of the orifices are 4 or more.

14. An internal combustion engine as in claim 13 wherein the number of the orifices are 5 to 7.

15. An internal combustion engine as in claim 1, wherein the swirling effect resulting in a swirl ratio in the range of 0.0 to 0.7.

16. An internal combustion engine as in claim 1, wherein a geometry of the inner bowl floor section in relation to the spray axis is arranged in such a way so that there is enough volume and distance between the inner bowl floor section and the spray axis so that disturbing contact between the unignited nozzle near portion of the spray and the inner bowl section is avoided.

17. An internal combustion engine as in claim 1, wherein the injected fuel, when injected, is arranged to form a mixture with the intake air in the combustion chamber, and that the mixture self ignites when compressed by the piston.

18. An internal combustion engine as in claim 1, wherein the engine is arranged to add a predetermined portion of recirculated exhaust gas to the intake air, the portion being adapted so that nitrogen oxide emissions emerging from the combustion are kept below a selected low level.

* * * * *